United States Patent
Wilson et al.

(10) Patent No.: US 11,003,426 B1
(45) Date of Patent: May 11, 2021

(54) IDENTIFICATION OF CODE FOR PARSING GIVEN EXPRESSIONS

(71) Applicant: SoundHound, Inc., Santa Clara, CA (US)

(72) Inventors: Christopher S. Wilson, Sunnyvale, CA (US); Keyvan Mohajer, Los Gatos, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 0 days.

(21) Appl. No.: 16/786,991

(22) Filed: Feb. 10, 2020

Related U.S. Application Data

(63) Continuation of application No. 15/585,163, filed on May 2, 2017, now abandoned, which is a continuation of application No. 14/534,044, filed on Nov. 5, 2014, now abandoned.

(60) Provisional application No. 62/048,797, filed on Sep. 10, 2014.

(51) Int. Cl.
*G06F 8/41* (2018.01)
*G06F 40/211* (2020.01)

(52) U.S. Cl.
CPC .............. *G06F 8/41* (2013.01); *G06F 40/211* (2020.01)

(58) Field of Classification Search
CPC ...................................... G06F 8/36; G06F 8/41
See application file for complete search history.

(56) References Cited

U.S. PATENT DOCUMENTS

| 8,392,464 | B2 | 3/2013 | Bloesch et al. |
| 9,268,558 | B2 | 2/2016 | Elshishiny et al. |
| 9,734,257 | B2 * | 8/2017 | Weber .................. G06F 16/958 |
| 2005/0251382 | A1 | 11/2005 | Chang et al. |
| 2007/0299825 | A1 | 12/2007 | Rush et al. |
| 2008/0066052 | A1 * | 3/2008 | Wolfram .................. G06F 3/01 717/109 |
| 2009/0222429 | A1 | 9/2009 | Aizenbud-Reshef et al. |
| 2010/0106705 | A1 | 4/2010 | Rush et al. |
| 2014/0013304 | A1 | 1/2014 | Vangala et al. |
| 2014/0165032 | A1 | 6/2014 | Balasubramanian et al. |
| 2014/0280110 | A1 | 9/2014 | Simitsis et al. |
| 2017/0154628 | A1 | 6/2017 | Mohajer et al. |
| 2019/0012311 | A1 | 1/2019 | Singh et al. |

OTHER PUBLICATIONS

Meling, "storing and retrieving software components: a component description manager", Aug. 2002, pp. 1-11.

(Continued)

*Primary Examiner* — Duy Khuong T Nguyen
(74) *Attorney, Agent, or Firm* — Fenwick & West LLP

(57) ABSTRACT

A command-processing server provides natural language processing services to applications. The command-processing server stores a set of code blocks, each code block being able to interpret a set of corresponding natural language expressions. The command-processing server accepts natural language expressions and identifies the code blocks that are capable of interpreting those expressions by attempting to parse the natural language expressions using the code blocks. The command-processing server then provides a list of the identified code blocks to the developers, who can then incorporate the code blocks into their applications.

19 Claims, 8 Drawing Sheets

(56) References Cited

OTHER PUBLICATIONS

Sindhgatta, "Using an information retrieval system to retrieve source code samples", May 2006, pp. 905-908.
United States Office Action, U.S. Appl. No. 14/534,044, dated Jul. 1, 2016, 41 pages.
United States Office Action, U.S. Appl. No. 14/534,044, dated Feb. 2, 2016, 29 pages.
United States Office Action, U.S. Appl. No. 15/585,163, dated Sep. 9, 2019, 48 pages.
United States Office Action, U.S. Appl. No. 15/585,163, dated Feb. 4, 2019, 55 pages.

* cited by examiner

200

Search

Last Updated: 2014/07/02 15:44:17.242217

205 — next thursday | Search | — 206

220A — Complete Match: "next Thursday" — 207  220C —

| Referenced | Block Name — 220B | Description |
|---|---|---|
| 221 — 18 | DATE() | Matches queries for a date including part of day such as "morning", "evening", but not a specific time |
| 222 — 39 | DAY_OF_WEEK() | Matches a day with an optional time, or a time with an optional day. Day can also be a holiday or event (e.g., "superbowl") |
| 224 — 36 | DATE_TIME_RANGE() | Returns a DateTimeRangeSpec. Matches phrases like "this weekend", "from Friday until the olympics", "for five days", "during the next three hours" |
| 225 — 14 | DATE_TIME_RANGE_FUTURE() | Matches queries about dates in the future, such as "next month", "in the next four years", "from august first until september third two thousand eighteen" |
| 226 — 1 | WHEN() | Returns a DateTime object corresponding to the given expression. |
| 223 — 16 | SOMETHING_ELSE() | Recognizes when someone has said something else, other than what was expected |

Partial Match: *"next"*

| Referenced | Block Name | Description |
|---|---|---|
| 18 | US_PLACE_NAME_AS_LOCATION | Matches to the block US_PLACE_NAME() and returns a MapLocationSpec structure. See MAP_LOCATION() for more details. |
| 39 | NAVIGATION_MAP_LOCATION() | This is a super set of MAP_LOCATION() that is more suitable for specifying relative locations. See MAP_LOCATION for more details. |
| 16 | SOMETHING_ELSE() | Recognizes when someone has said something else, other than what was expected |

⎫ 240

Partial Match: *"thursday"*

| Referenced | Block Name | Description |
|---|---|---|
| 18 | DAY_OF_WEEK() | Matches to the block US_PLACE_NAME() and returns a MapLocationSpec structure. See MAP_LOCATION() for more details. |
| 42 | DATE() | Matches queries for a date including part of day such as "morning", "evening", but not a specific time. |
| 16 | DATE_AND_TIME() | Matches a date with an optional time, or a time with an optional date. Date can also be a holiday or event (e.g. "superbowl") |
| 18 | DATE_TIME_RANGE_PAST() | Matches queries about dates in the past, such as "last month", "in the past four years", "from august first until september third two thousand eleven" |
| 29 | DATE_TIME_RANGE() | Returns a DateTimeRangeSpec. Matches phrases like "this weekend", "from Friday until the olympics", "for five days", "during the next three hours" |
| 23 | SOMETHING_ELSE() | Recognizes when someone has said something else, other than what was expected |

Search

Last Updated: 2014/07/02 15:44:17.242217

| next thursday through next friday | | Search |

Complete Match: "next thursday through next friday"

260

| Referenced | Block Name | Description |
|---|---|---|
| 36 | DATE_TIME_RANGE() | Returns a DateTimeRangeSpec. Matches phrases like "this weekend", "from Friday until the olympics", "for five days", during the next three hours" |
| 14 | DATE_TIME_RANGE_FUTURE() | Matches queries about dates in the future, such as "next month", "in the next four years", "from august first until september third two thousand eighteen" |
| 16 | SOMETHING_ELSE() | Recognizes when someone has said something else, other than what was expected |

FIG. 2C

Search

Last Updated: 2014/07/02 15:44:17.242217

| next Easter | Search |
|---|---|
| | Add |

Complete Match: "friday through monday" AND "next Easter"

| Referenced | Block Name | Description |
|---|---|---|
| 14 | DATE_TIME_RANGE_FUTURE() | Matches queries about dates in the future, such as "next month", "in the next four years", "from august first until september third two thousand eighteen" |
| 16 | SOMETHING_ELSE() | Recognizes when someone has said something else, other than what was expected |

*FIG. 2D*

IDENTIFICATION OF CODE FOR PARSING GIVEN EXPRESSIONS

RELATED APPLICATIONS

This application is a continuation of U.S. patent application Ser. No. 15/585,163, filed May 2, 2017, which in turn is a continuation of U.S. patent application Ser. No. 14/534,044, filed Nov. 5, 2014, which in turn claims the benefit of Provisional Application No. 62/048,797, filed on Sep. 10, 2014, all of which are hereby incorporated herein by reference.

TECHNICAL FIELD

The disclosed embodiments relate generally to programming tools for designing software applications, and more specifically, to tools for searching code libraries to identify code that accomplishes specified programming tasks.

BACKGROUND

When developing software applications, a software developer typically relies on code developed by others. Specifically, in the field of natural language processing, software applications use particular programming code to interpret and respond to complex linguistic inputs, such as user queries or other expressions in a natural language (whether specified as text or as speech). Implementing such interpretation code in a usable, accurate, and efficient manner is typically highly complex and requires a sophisticated understanding of computational linguistics and learning the specifics of a development environment—things that are often beyond the skills of a typical application developer. For example, a developer of a natural language interface to a shopping application, a music player, or a calendaring application may not have any prior knowledge or experience in developing natural language processing code. Hence, instead of developing such interpretation code themselves, most such software developers would benefit by using an established interpretation engine and a corresponding repository of interpretation code developed by a third party. Such a repository contains preexisting units of natural language interpretation code (hereinafter referred to as "code blocks") that, when executed by the interpretation engine, will parse certain set of input natural language expressions. In this scenario, when a developer's application needs to perform a particular interpretation task, such as to interpret a user's natural language expression of a desired period of time (e.g., "schedule a meeting for next Saturday afternoon,"), of desired products to locate (e.g., "I want a black jacket, size 5"), or the like, the developer will need to search and examine the code repository for an existing code block that is designed to interpret expressions of the desired type.

However, identifying the most appropriate code blocks for interpreting a given type of expression is difficult. For example, a developer could search the repository according to the given names of the code blocks, e.g., searching for a code block named "Date" when attempting to locate a code block that can properly interpret a date expression. However, searching by name burdens the developer with guessing the name of the desired code block. Many of the code blocks may have different names, and hence searching by name will cause developers to overlook many relevant code blocks. For example, searching for a block named "Date" would not discover code blocks that do in fact interpret the desired expression but are named "Day". Further, even when searching by name locates code blocks that are generally in the desired semantic area, the located code blocks still typically fail to capture more subtle variations. For example, searching for the name "Date" might locate many code blocks that interpret straightforward expressions such as "Apr. 5, 2015," but would fail to interpret more indirect expressions, such as "next Easter," which, in some application contexts, would be the preferred choice.

SUMMARY

A command-processing server provides natural language processing services to applications. The command-processing server stores a set of code blocks, each code block being able to interpret a set of corresponding natural language expressions. (To "interpret" an expression, as used herein, means to parse the expression to determine whether it conforms to a given pattern and whether it satisfies all given semantic constraints (if any).) The command-processing server accepts natural language expressions—e.g., from developers of software applications for which a natural language interface is desired—and identifies the code blocks that are capable of interpreting those expressions. The command-processing server then provides in return a list of the identified code blocks; the developers can then choose among the returned blocks and incorporate the chosen code blocks into their applications to implement the desired natural language interface.

In one embodiment, the code blocks are implemented using a procedural programming language extended with additional constructs for specifying natural language interpretation. In such embodiments, the code blocks have associated metadata (e.g., block name and description), as well as code that specifies a pattern defining the set of natural language expressions that the block can interpret, a set of (zero or more) output variables that represent the meaning of an expression interpreted using the block, and programming actions that are taken in response to a successful interpretation of an expression, such as actions that verify semantic constraints. An interpretation of a natural language expression by a code block is considered successful if the expression can be parsed according to the pattern of the code block and all semantic constraints (if any) specified by the code block are satisfied.

In one embodiment, a successful interpretation of an expression by a code block is assigned a match strength measure based on weights associated with sub-expressions of the pattern. The match strength measures of the various code blocks that successfully interpret a natural language expression can be used as a way to rank the different code blocks with respect to the expression.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 2A-2D illustrate example user interfaces used by developers to search for and view code blocks, according to one embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
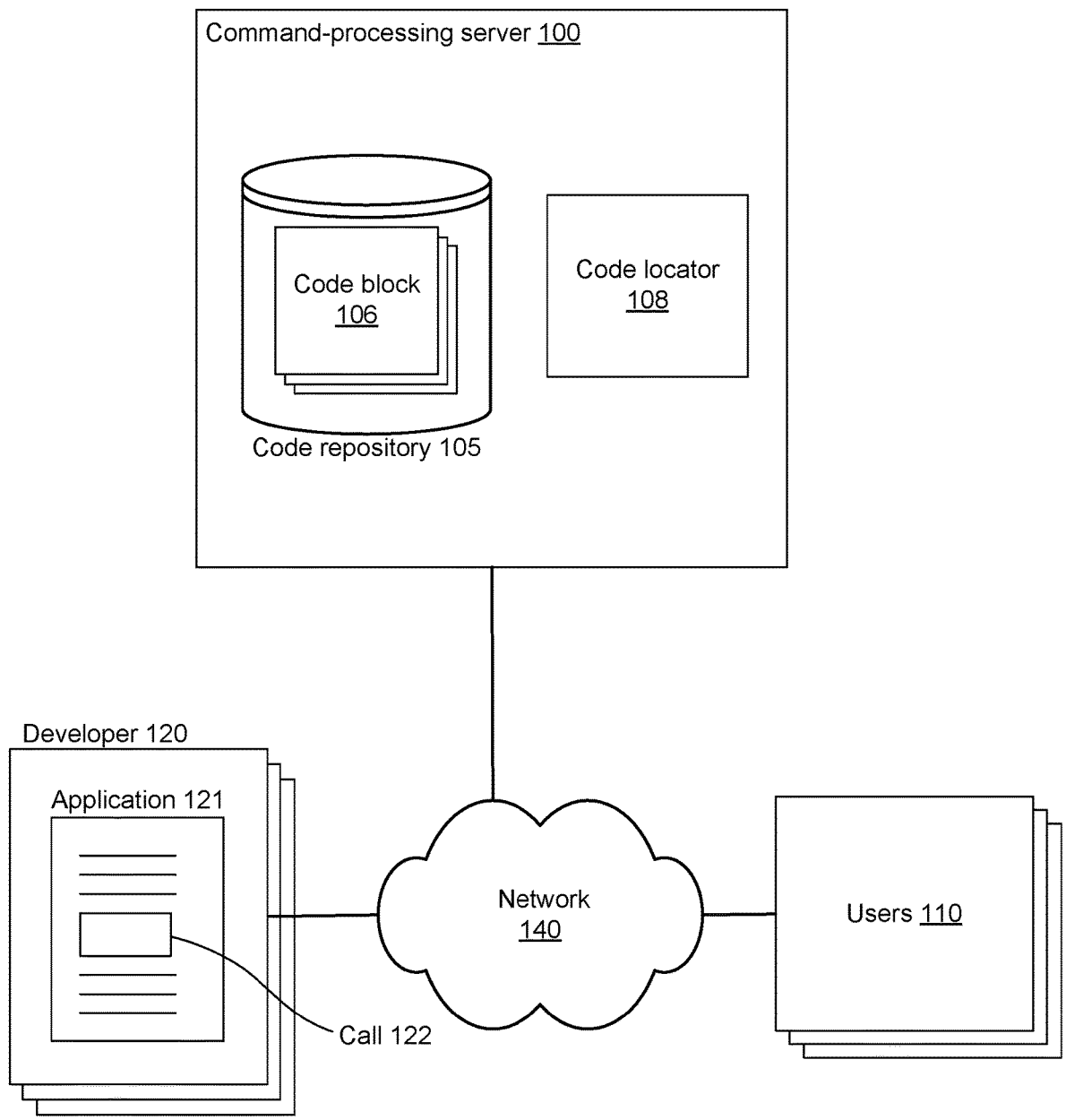
FIG. 1 shows a system environment including a command-processing server and systems of developers and users, according to one embodiment.

FIG. 1 shows a system environment including a command-processing server 100, developer systems 120 (hereinafter "developers" for the sake of brevity), and user systems 110 (hereinafter "users"). The users use applications 121 of the developers 120, which in the illustrated embodiment are executed (hosted) by the developers 120 and provide a user interface to such applications over network 140. In other embodiments, developers 120 create the code for application components (such as verticals), and the code is assembled, integrated, and compiled into larger applications (such as virtual assistants), which may be hosted on systems other than those of the developers 120. A portion of the user interfaces of the applications 121 is configured to receive natural language expressions (e.g., text or speech) as inputs. In one embodiment, the applications 121 themselves execute natural language interpretation code (including code blocks obtained at least in part via the command-processing server 100) to interpret the received natural language expressions; in another embodiment the applications 121 delegate the interpretation to another system (e.g., the command-processing server 100), which performs the interpretation using the code blocks obtained at least in part via the command-processing server and provides the results of the interpretation back to the applications 121. With the natural language expressions interpreted, the applications 121 can take an action in response to the interpreted expressions. For example, if the natural language expression is a database query, the execution of the natural-language interpretation code produces a corresponding set of output variable values representing the meaning of the query (e.g., name of product to search for, desired price, etc.), and the applications 121 can then execute the query using the output variable values.

Further details of the server 100, developers 120, and users 110 and their interactions are now provided.

The command-processing server 100 includes a code repository 105 that has a set of code blocks 106. Each code block 106 programmatically defines a set of natural language expressions (herein "expressions") that it is able to interpret, such as expressions describing a date or time, expressions describing a desired product for purchase, or the like. The code blocks 106 are created by personnel responsible for the command-processing server 100 itself, as well as by the various developers 120, and are submitted to the command-processing server 100. In one embodiment, each code block may have an associated "locatable" property that determines whether it is eligible to be located by a code locator module 108 in response to a user query.

The command-processing server 100 additionally includes a code locator module 108 that accepts, from a developer 120, an expression that the developer 120 intends to have an application 121 handle and thus which needs to be interpreted. In response, the code locator module 108 searches the code repository 105 and provides to the developer 120 a list of the code blocks 106 that are able to interpret that expression (and, in one embodiment, that have a value for the "locatable" property, such as "true", that permits them to be located by a search). The developer 120 can then examine information about those code blocks 106 and incorporate one or more of the code blocks in the developer's own applications, for example by including in the application code a call to an application programming interface of the command-processing server 100 that invokes the code block. In one embodiment, the author of a code block may declare it to be "open source," in which case other another developer may also copy that code block into the application code and perform editing on it.

FIG. 2A illustrates an example user interface 200 used by the developers 120 to search for code blocks 106, according to one embodiment.

Search area 205 allows a developer to input the desired expression that code blocks 106 should be able to interpret. In the example of FIG. 2, the developer 120 using the user interface 200 has input the expression "next thursday." The code locator module 108 identifies which code blocks 106 can interpret this expression or any sub-expression thereof. The results area 220 accordingly displays code blocks 106 from the code repository 105 that can interpret the expression "next thursday"—i.e., that successfully parse the expression. In the example of FIG. 2A, the code blocks 106 that can interpret the complete expression "next thursday" include the code blocks with the names 220B "DATE( )", "DAY_OF_WEEK( )", "SOMETHING_ ELSE( )", "DATE_TIME_RANGE( )", "DATE_TIME_RANGE_FUTURE( )", and "WHEN( )".

In one embodiment, a developer can click on or otherwise designate the code blocks 220B to obtain additional information about the code blocks. For example, in one embodiment, clicking on a code block 220B in the results area 220 displays a signature of the code block (i.e., name and output variables that represent the meaning of the an expression as interpreted by the code block) so that the developer can call the code block via its own code. In another embodiment, clicking on a code block 220B in the results area displays the full code of the code block (if the code block's author has set it to be "open source"), which includes the signature. In another embodiment, clicking on a code block 220B in the results area displays a page with additional metadata about the code block (e.g., the code block's author).

In one embodiment, code blocks 106 that can interpret sub-expressions of the specified expression are also shown to the developer 120. For example, FIG. 2B illustrates a continuation of the example user interface 200 of FIG. 2A, e.g., a portion of the user interface below that displayed in FIG. 2A. The results area 240 displays code blocks that can interpret the sub-expression "next" of the specified expression "next thursday"—that is, the code blocks with patterns that the sub-expression matches and whose semantic constraints are not violated by the expression. Similarly, the results area 245 displays code blocks that can interpret the sub-expression "thursday". The additional code blocks 106 that can interpret sub-expressions may be useful to developers, particularly when there are few code blocks that can interpret the complete expression.

FIG. 2C illustrates the results provided by the code locator module 108 when searching for code blocks 106 that can interpret the more complex expression 260, "next thursday through next friday", which adds the concept of a time range to the simpler expression "next thursday" illustrated in FIG. 2A. Specifically, fewer code blocks 106 are located: namely, DATE_TIME_RANGE( ), DATE_TIME_RANGE_FUTURE( ), and SOMETHING_ELSE( ), since the other blocks from FIG. 2A are only able to interpret expressions for individual times, and not ranges of times.

Note that the names of the code blocks 106—which are typically specified by their respective authors—can vary widely. Thus, returning again to FIG. 2A, a developer 120 searching in a conventional system (not illustrated here) for blocks by name (rather than by expression interpreted, as illustrated in FIG. 2) using the term "date" would fail to see the "DAY_OF_WEEK( )", "SOMETHING_ELSE( )", and "WHEN( )" code blocks, even though they also are capable of interpreting dates. Even if the developer subsequently additionally searched by name for the term "day", the aggregate results of "date" and "day" would still not include the "SOMETHING_ELSE( )" and "WHEN( )" blocks.

Referring again to FIG. 2A, the user interface 200 includes information for each matching block, including the block metadata such as the name 220B of code block 106 and the description 220C of the code block (e.g., "DATE( )" and "Matches queries for a date including part of day such as 'morning', 'evening', but not a specific time", respectively). The user interface 200 of the example of FIG. 2A also includes a count 220A of the number of times that the corresponding block 106 has been referenced by other blocks in the code repository 105, which serves to indicate block popularity and is one way for a developer to estimate the usefulness of a code block.

In one embodiment, the code blocks 106 of the results area 220 are ordered according to match strengths between the code blocks and the expression as evaluated based on weights associated with portions of the code blocks, as will be discussed later in more detail. In the example of FIG. 2, the code block 106 named "DATE( )" has the highest match strength, the block "DAY_OF_WEEK( )" the next highest, and so forth.

The command-processing server 100 is described in additional detail with respect to FIG. 3, below.

Returning again to FIG. 1, the developers 120 develop software applications 121 that involve interpretation of expressions, such as queries or other commands from a user. In order to accomplish the interpretation, the applications 121 include calls 122 to the code blocks 106 that perform the desired interpretation. For example, a calendar application 121 might need to interpret user commands such as "add appointment for next Easter." Accordingly, the application 121 could include (directly or indirectly) a call to a code block 106 that, when executed as part of execution of the application 121, interprets the date expression "next Easter" and returns (for example, among other possible outputs) the values "4", "5", "2015," corresponding to the output variables "month," "day," and "year" that represent the meaning of the date expression. The application 121 can use the values produced by the code block to take an action in response to the user command expression, such as creating an appointment calendar item for Apr. 5, 2015. Depending on the embodiment, the code block 106 could be linked locally into the application 121 (in which call the call 122 is local), or it could be hosted in executable form on a separate server system (e.g., the command-processing server 100) and accessed by the remote application 121 via an API call sent over the network 140, for example.

The command-processing server 100 and systems of the developer 120 and users 110 may be implemented with various forms of hardware in different embodiments. Developers 120 and users 110 communicate with the command-processing server 100 through network 140. The network may be any suitable communications network for data transmission. In one embodiment, network 140 is the Internet and uses standard communications technologies and/or protocols.

Figure 3:
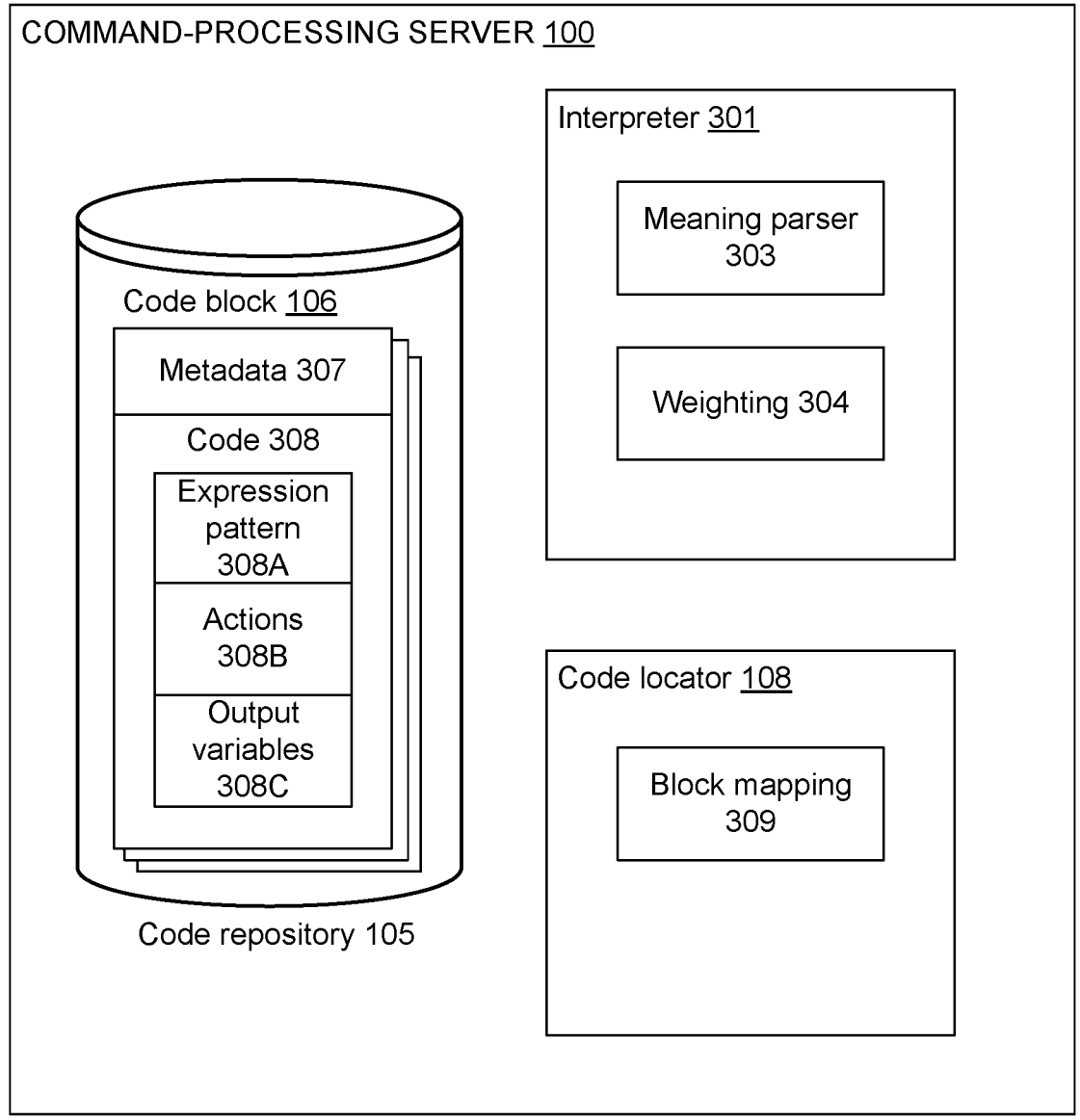
FIG. 3 illustrates in more detail the components of the command-processing server of FIG. 1, according to one embodiment.

FIG. 3 illustrates in more detail the components of the command-processing server 100 of FIG. 1, according to one embodiment. As can be appreciated by one of skill in the art, the configuration of the command-processing server 100 results in a particular, non-generic computer system that is specifically structured to perform the functions described herein.

Each code block 106 of the code repository 105 has associated metadata 307, such as a name, a description, an author, and a date of submission. The command-processing server 100 exposes a user interface (e.g., either graphical or command line) to upload a code block to the code repository 105 and to specify the block's associated metadata, and a developer 120 uses that user interface to specify a particular code block to upload, as well as the block's name (e.g., "DAY_OF_WEEK( )"), its short description (e.g., "Matches names of weekdays such as 'Sunday' or 'Wednesday'"), its author (e.g., XYZ Software Corp), and any other additional properties. The command-processing server would then associate the given name, description, and author values, along with the date and time of submission, as the metadata 307 for the provided code block.

Each code block 106 also has code 308 defined in a programming language. The code 308 defines a pattern 308A for the expressions that the code block can interpret (e.g., an expression specifying a date, a location, a product, etc.), optionally empty programming actions 308B that define semantic constraints, and optional output variables 308C representing the meaning of the expression (e.g., a month, day, and year representing the date; a place name representing the location; or product name representing the product). A code block is said to be able to interpret an expression if the expression can be successfully parsed according to the expression pattern 308A of the code block 106, and if all the semantic constraints (if any) defined by the actions 308B are satisfied. If the expression can be successfully interpreted by a given code block 106, the interpretation has an associated meaning defined by values of the output variables 308C, and (in embodiments with a weighting module 304, as described below) an associated strength measure. If the expression cannot be successfully interpreted by the code block, in one embodiment the interpretation returns a NULL value or other value signifying that the expression could not be interpreted by the code block; in another embodiment, the failure to interpret a code block does not result in any return value.

The expression pattern 308A may be a grammar pattern (e.g., the right-hand size of a context-free grammar rule, such as that specified by Backus-Naur Form (BNF) or Extended Backus-Naur Form (EBNF)), a regular expression, a finite state automaton (FSA), or the like. The expression pattern 308A may be specified in terms of other code blocks, thereby allowing for hierarchical relationships between code blocks, and parsing of expressions. For example, the expression 308A for a code block for interpreting a date-time expression could be specified in terms of a particular code block for a date, followed by a particular code block for a time. The programming actions 308B may be used to assign values to the output variables 308C based on the expression that the code block 106 interprets.

In one embodiment, the programming language is a general purpose procedural programming language that is extended with additional programming constructs for specifying natural language interpretation, such as the patterns 308A of the expressions to be matched. In one embodiment, the code blocks 106 are defined by an extended procedural programming language based on C++ in which "interpret" blocks define the expression 308A to be matched, the code block parameter list defines the output variables 308C, and standard C++ statements define the programming actions 308B. It is appreciated that languages other than C++ could equally be used in other embodiments.

In one embodiment a code block 106 has the general schema "block outputVariablesList blockName pattern programmingActions", where "outputVariablesList" is the output variables 308C, "blockName" is the given name of the block, "pattern" is the expression pattern 308A, and "programmingActions" is the actions 308B. One simple, concrete example of the use of this extended procedural programming language follows in Listing 1, below:

---

[Listing 1]

```
extern block (int totalPoints) TENNIS_POINTS( ) {
    interpret {
        (["what is" | 10 "tell me"] . ["the"] . "number of
        points played when announcer says" .
        n1=VALID_TENNIS_NUMBER( ) . ["to"] .
        n2=VALID_TENNIS_ NUMBER( ))
    } as {
        totalPoints = (Points(n1->count) +Points(n2->count));
    }
}
static block (int count) VALID_TENNIS_NUMBER( ) {
    interpret {
        n_ love=LOVE( ) | n=INTEGER_COUNT( )
    } as {
        if (n_love) {count = 0;}
        else {
            if ( ( n->count != 15) && (n->count != 30) && (n-
            >count != 40) ) {excludethis( );}
            else {count = n->count;}
        }
    }
}
static block ( ) LOVE( ) {
    interpret {
        "love"
    } as { }
}
int Points(int score) {
    switch (score) {
        case 0: return 0; break;
        case 15: return 1; break;
        case 30: return 2; break;
        case 40: return 3; break;
        default: return –1;
    }
}
```

---

In the above example, the code block 106 named TENNIS_POINTS( ) is able to interpret an expression embodying a request to determine how many points have been played in a game based on the game score in a tennis match, with the meaning of the expression represented by output variables 308C in the parameter list (namely, the integer "totalPoints"). The expression pattern 308A—namely, (["what is"|10 "tell me"]. ["the"]. "number of points played when announcer says". n1=VALID_TENNIS_NUMBER( ).

["to"]. n2=VALID_TENNIS_NUMBER ( ))—defines a set of possible expressions that a user may input (either in text or speech) to request the current number of points so far in a tennis game. The expressions optionally begin with either the phrase "what is" or "tell me", optionally followed by the word "the", followed by the phrase "number of points played when announcer says", followed by two numbers that are valid in tennis and that are optionally separated by the word "to".

The numbers that are valid in tennis are in turn represented by their own code blocks 106 named "VALID_TENNIS_NUMBER" and which accepts the scores 15, 30, 40, or "love". Thus, the expression pattern 308A of this example code block can interpret the expression "what is the score when announcer says fifteen love" (in which case its meaning is represented by the value 1 for the totalPoints output variable), but not "what is the score when announcer says fifteen eighty" because the former expression can be successfully parsed according to the expression pattern 308A, but the latter expression cannot (because "eighty" is not a valid tennis number).

Accordingly, referring again to the example of FIG. 2A, the code block TENNIS_POINTS( ) could be located by typing the string "what is the score when announcer says fifteen love" into the search area 205. Similarly, the code block VALID_TENNIS_NUMBER( ) could be located by typing the string "fifteen" or "love".

Note that the code block INTEGER_COUNT( ) is not defined in Listing 1, but (for example) is authored by a separate developer and submitted to the code repository 105 for use by others, such as the author of the TENNIS_POINTS( ) code block of Listing 1.

Note also that the programming actions 308B may accomplish different types of purposes. For example, the programming actions 308B of the block TENNIS_POINTS( ) (i.e., the code "totalPoints=(Points (n1→count)+Points (n2→count));") simply converts the given two scores to point values and sums them, whereas the programming actions 308B of the VALID_TENNIS_NUMBER( ) block (i.e. the code beginning with "if (n_love) {count=0;}") specifies the semantic constraint that the score be "15", "30", or "40"; if this semantic constraint is not satisfied, the excludethis( ) function will be called to abort the parse as unsuccessful.

The command-processing server 100 comprises an interpreter module 301 that takes a natural language expression as input and determines whether a given code block 106 can interpret that expression and if so (optionally) a match strength measure between the given code block and the expression. A code block 106 is considered to be able to interpret an expression if the expression can be parsed according to the code block's expression pattern 308A and satisfies the code block's semantic constraints (if any).

The interpreter module 301 has a meaning parser module 303 that accepts textual input for a natural language written expression and determines whether a given code block 106 can interpret that textual input.

In one embodiment, the interpreter module 301 also has a weighting module 304 that assigns values to successful interpretations of an expression as a way to rank the relative strength of the successful interpretations. Specifically, the weighting module 304 computes a match strength measure corresponding to a measure of strength of a parse obtained by a code block 106 parsing the given expression, such as a likelihood that the parse produces the utterance. The match strength measure is determined as a function of weights assigned to sub-expressions within the given expression that ultimately matches the input. In one embodiment, the weights of sub-expressions represent likelihoods of the sub-expressions, and the weight of the matching expression is calculated as the product of the weights of the sub-expressions. For instance, referring to the above code example of Listing 1, the expression pattern 308A for the TENNIS_POINTS code block is composed of sub-expressions such as "what is", "tell me", "the", "number of points when announcer says", VALID_TENNIS_NUMBER( ) (a separate code block), and "to". In the disjunction for the optional sub-expression ["what is"|10 "tell me"], the value 10 serves as a weight corresponding to the sub-expression "tell me". This causes the weighting module 304 to assign a likelihood value of 1/(1+10)=1/11 to the alternative "what is", and 10/(1+10)=10/11 to the alternative "tell me", reflecting an expectation that a user will be 10 times as likely to say "tell me" as the user would be to say "what is" when expressing a request for a tennis score. Accordingly, expressions that are interpreted by the TENNIS_POINTS( ) code block 106 and that begin with "tell me" will obtain higher match strength (0.9090) measures than those that match but begin with "what is" (0.0909).

In one embodiment, the match strength measures produced by the various code blocks 106 for a given expression are used to order the code blocks when reporting the matches to the querying developer, as in FIG. 2A, where the code block DATE( ) has a higher match strength measure than DAY_OF_WEEK( ) (for example). The programming action 308B of the TENNIS_POINTS( ) code block (namely, "totalPoints=(Points(n1→count)+Points(n2→count));") assigns values to the output variable 308C by specifying that the "totalPoints" output variable should be assigned the sum of the "count" field of the variable "n1" (the result of interpreting the first VALID_TENNIS_NUMBER( )) and of the "count" field of the variable "n2") (the result of interpreting the second VALID_TENNIS_NUMBER( )), both fields being mapped from tennis scores to a number of points using the "Points( )" function.

In one embodiment, in order to find the code blocks 106 that match a given expression, the code locator module 108 attempts to interpret the expression using each code block in the code repository 105 (or some subset thereof). The code locator module 108 notes a unique identifier of each code block 106 that successfully interprets the expression, such as the block's name (if it is unique), or an index of the block within the code repository 105, or any other form of identifier that is unique. The unique code block identifiers can then be used to obtain metadata or other information about the code blocks that match the expression, e.g., in order to present it in a user interface such as that of FIGS. 2A-2C.

In another embodiment, in order to simplify and accelerate locating code blocks that match a given expression, the code locator module 108 prepares an aggregate expression of the expression patterns 306A of some or all of the code blocks 106 in the code repository 105. In one embodiment, the aggregate is a disjunction, in which the expression pattern 306A of each of the code blocks 106 in the code repository 105 is logically ORed with those of the other code blocks 106. In one embodiment, the disjunction of a set of blocks $b_1, \ldots, b_N$ is itself represented as a block (and is generated by the code locator module 108), such as the following, using the same programming language as in Listing 1:

```
static block (int blockID) Disjunction( ) {
  interpret {b1} as {blockID=ID_1;}
  ...
  interpret {bN} as {blockID=ID_N;}
}
```
Listing 2

As a result of execution of the block named "Disjunction", each block $b_i$ is executed, and a block ID of each block that matches the given expression is returned.

In one embodiment, the code locator module 108 generates a finite state automaton that represents the aggregate expression (e.g., the disjunction) and that when executed against a natural language expression in effect attempts to match all of the expressions of the aggregate expression. That is, execution of the finite state automaton against the natural language expression will cause the finite state automaton to reach a set of terminal states corresponding to different ones of the code blocks; the code blocks corresponding to those terminal states are the code blocks that successfully parsed the natural language expression. In one embodiment, the code locator module 108 prepares (or update) the finite state automaton each time that a new code block 106 is added to the code repository 105. The finite state automaton can be optimized to reduce the execution time required to attempt to interpret an expression using each of the N code blocks 106.

In one embodiment, the code locator module 108 also identifies code blocks 106 that can interpret sub-expressions of a given expression, rather than only the entire expression. For example, the code locator module 108 forms sequences of distinct whitespace-separated tokens (e.g., the two one-word sequences "next" and "Thursday" from the expression "next Thursday") from the expression and identifies code blocks 106 that match those sequences. The code locator module 108 can then provide information about those code blocks 106, as well as the code blocks that can match the entire expression, as illustrated in FIGS. 2A-2B.

The code locator module 108 can be configured to receive multiple different expressions to search for at once, and provides information only on the code blocks 106 that can interpret all of the specified expressions. For example, a developer wishing to locate code blocks 106 capable of handling both specific holidays, and ranges of dates, could specify both of the expressions "next Easter" and "Friday through Monday." The code locator module 108 would then find, and provide information on, only the code blocks 106 that were determined to be able to interpret both of those expressions. For example, FIG. 2D illustrates an "Add" button 271 that allows a developer to specify an additional expression that should be matched by located code blocks, in addition to other expressions previously specified. For instance, in FIG. 2D, a developer could enter the expression "friday through monday" in area 270, use the "Add" button 271, enter the additional expression "next Easter" in area 270, and then use the "Search" button 206 to execute the resulting query "friday through monday" AND "next Easter", as shown in area 207.

Figure 4:
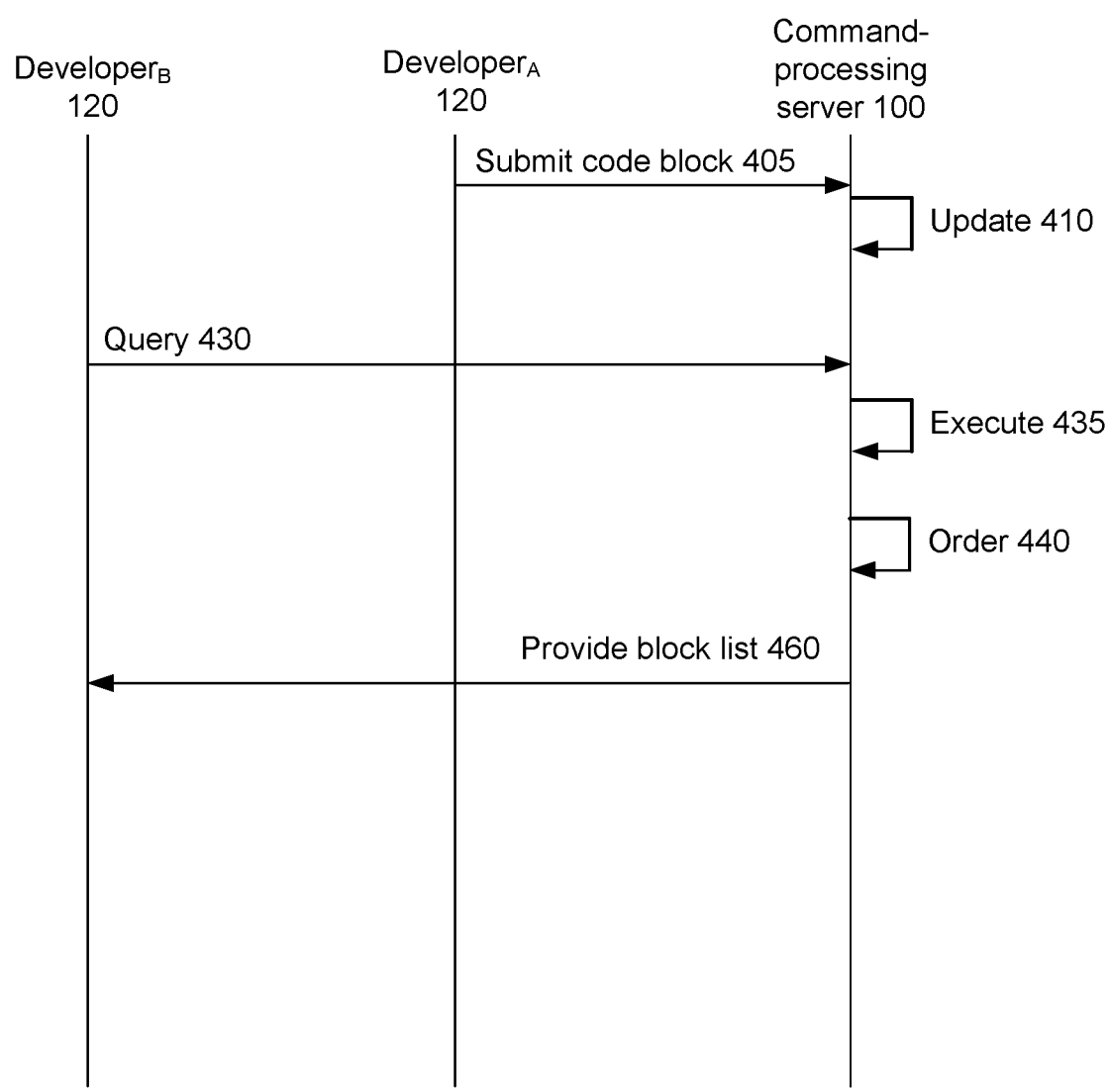
FIG. 4 illustrates the interactions between developers and the command-processing server that take place when submitting and searching for code blocks, according to one embodiment.

FIG. 4 illustrates the interactions between developers 120 and the command-processing server 100 that take place when submitting and searching for code blocks 106, according to one embodiment.

A first developer 120 submits 405 a code block 106 to the code repository 105. For example, the command processing server 100 can expose a web-based graphical user interface or a command line interface to receive a file containing the code block 106 and any metadata associated with that code block, such as a name of the code block distinct from the name in its code 308. In one embodiment, a code block can refer to other code blocks (e.g., via a #include or similar preprocessor directive), and the submission of a single "top-level" code block, or a project that includes multiple code blocks, results in the automatic submission of the referred-to code blocks, thereby reducing the effort of submission.

The command-processing server 100 accordingly updates 410 the code repository 105 to include the submitted code block 106 and its associated metadata (if any). In some embodiments, the command-processing server 100 also takes additional actions, such as updating the aggregate expression discussed above with respect to the code locator module 108, or updating counts of number of times that the various code blocks 106 refer to each other, based on analysis of the other code blocks that the code block being submitted refers to, for example.

Separately, a second developer submits 430 to the command-processing server 100 a query for code blocks 106 that match an expression specified by the query (e.g., "next Easter"). The command-processing server 100 accordingly executes 435 the query by using the meaning parser 303 to identify the code blocks 106 that can interpret the query expression. That is, the meaning parser 303 attempts to interpret the query expression using each of some set of the code blocks 106. Depending on the embodiment, this may involve executing an aggregate expression, such as a disjunction of the patterns 308A for the code blocks 106 (e.g., the execution for which is implemented using a finite state automaton, as described above), or by sequentially attempting to interpret the query expression using each code block 106. In one embodiment, the command-processing server 100 also determines which code blocks 106 successfully parse sub-expressions, even if not the entire expression. For example, in this embodiment the code locator module 108 forms sub-expressions of one or more sequential words in the expression (such as "next" and "thursday", as shown in FIG. 2B) and treats them as expressions that it attempts to interpret using the meaning parser 303.

In one embodiment, the command-processing server 100 also orders 440 the identified blocks, e.g., according to match strength measures representing match strengths, as discussed above with respect to the weighting module 304.

The command-processing server 100 provides 460 a list of the identified code blocks 106 and associated information (e.g., developer-provided metadata such as name and/or description, or system-calculated data such as number of references to the code block) to the developer, e.g., as part of a user interface such as those illustrated in FIGS. 2A-2C. The developer 120 can then review the various identified code blocks 106, optionally revise the search expression, and ultimately incorporate a call to the code block that seems most suitable within the developer's application 121.

Example Computer Architecture

Figure 5:
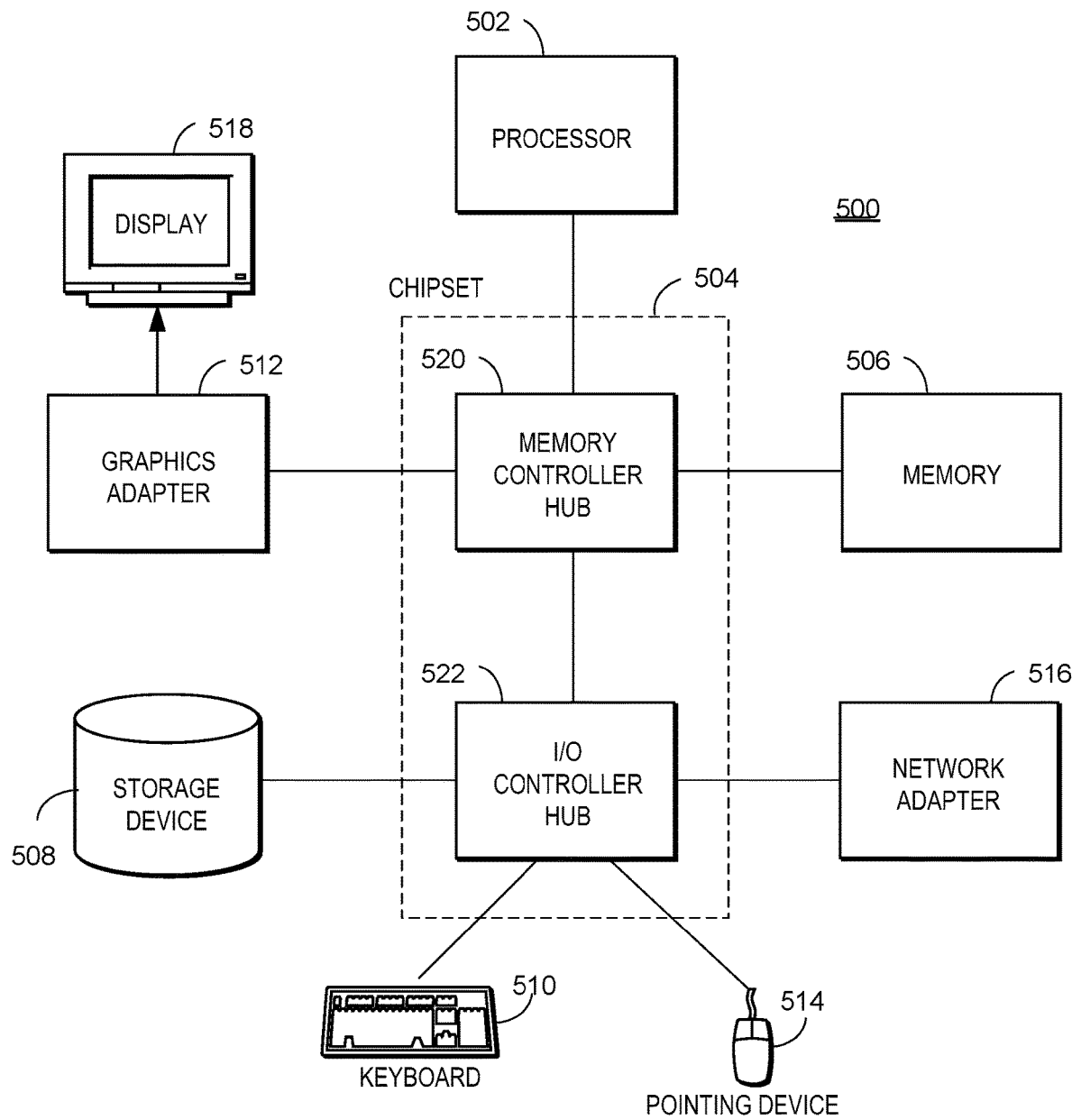
FIG. 5 is a high-level block diagram illustrating physical components of a computer used as part or all of the command-processing server or developer or user systems of FIG. 1, according to one embodiment.

FIG. 5 is a high-level block diagram illustrating physical components of a computer 500 used as part or all of the command-processing server 100 or systems 110, 120 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions can be embodied in software, firmware or hardware, and when embodied in software, can be downloaded to reside on and be operated from different platforms used by a variety of operating systems.

The operations herein may also be performed by an apparatus. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims that follow.

What is claimed is:

1. A non-transitory computer-readable storage medium storing a computer program having instructions executable by a processor, the instructions comprising:
    instructions for storing a set of code blocks in a code repository, each code block comprising programming code configured to parse a corresponding set of natural language expressions, wherein at least some of the code blocks specify patterns that reference other code blocks;
    instructions for receiving a first code block from a first developer;
    instructions for storing the first code block in the code repository;
    instructions for receiving a natural language expression from a second developer seeking code blocks capable of parsing the natural language expression, the second developer different from the first developer;
    instructions for, for each code block of a plurality of the code blocks, attempting to parse the natural language expression by executing the code block and determining whether the code block matches the natural language expression;
    instructions for identifying a list of code blocks that successfully parse the natural language expression, the list of identified code blocks comprising the first code block; and
    instructions for outputting, to the second developer, metadata of blocks from the list of identified code blocks that successfully parse the natural language expression.

2. The non-transitory computer-readable storage medium of claim 1, wherein at least one of the code blocks includes:
    output variables that represent a meaning of the code block; and
    programmatic actions that assign values to the output variables based on an expression that the code block parses.

3. The non-transitory computer-readable storage medium of claim 1, wherein determining whether the code blocks can parse the natural language expression comprises calculating match strength measures corresponding to the code blocks using weights specified within grammar patterns specified by the code blocks, the instructions further comprising:
    instructions for ordering the code blocks identified to be capable of parsing the natural language expression according to the match strength measures;
    wherein the code blocks in the output list are arranged according to the ordering.

4. The non-transitory computer-readable storage medium of claim 1, the instructions further comprising:
    instructions for receiving a plurality of different natural language expressions;
    instructions for determining, for each code block of the stored code blocks, whether the code block can parse all of the received expressions; and
    instructions for outputting a list of the code blocks determined to be able to parse all of the received natural language expressions.

5. The non-transitory computer-readable storage medium of claim 1, wherein the output list is provided in a first region of a user interface, the instructions further comprising:
    instructions for determining which of the code blocks can parse a sub-expression of the natural language expression; and
    instructions for providing information about the code blocks determined to be able to parse the sub-expression in a second region of the user interface that is visually distinct from the first region.

6. The non-transitory computer-readable storage medium of claim 1, wherein attempting, for each code block of a plurality of the code blocks, to parse the natural language expression, comprises:
    generating a new code block that refers to each of the plurality of the code blocks;
    the new code block allowing the identification of each of the plurality of the code blocks that successfully parses the natural language expression;
    executing the new code block that refers to each of the plurality of the code blocks; and
    obtaining the list of the identified code blocks capable of parsing the natural language expression as a result of the executing of the new code block.

7. The non-transitory computer-readable storage medium of claim 1, wherein the patterns specified by the at least some of the code blocks are specified using a context-free grammar.

8. A computer-implemented method for identifying code blocks capable of parsing specified expressions, the method comprising:
    storing a set of code blocks in a code repository, each code block comprising programming code configured to parse, a corresponding set of natural language expressions, wherein at least some of the code blocks specify patterns that reference other code blocks;
    receiving a first code block from a first developer;
    storing the first code block in the code repository;
    receiving a natural language expression from a second developer seeking code blocks capable of parsing the natural language expression, the second developer different from the first developer;
    for each code block of a plurality of the code blocks, attempting to parse the natural language expression by determining whether the code block matches the natural language expression;
    identifying a list of code blocks that successfully parse the natural language expression, the list of identified code blocks comprising the first code block; and
    outputting, to the second developer, metadata of blocks from the list of identified code blocks that successfully parse the natural language expression.

9. The computer-implemented method of claim 8, wherein at least one of the code blocks includes:
    output variables that represent a meaning of the code block; and
    programmatic actions that assign values to the output variables based on an expression that the code block parses.

10. The computer-implemented method of claim 8, further comprising:
receiving a plurality of different natural language expressions;
determining, for each code block of the stored code blocks, whether the code block can parse all of the received expressions; and
outputting a list of the code blocks determined to be able to parse all of the received natural language expressions.

11. The computer-implemented method of claim 8, wherein the output list is provided in a first region of a user interface, the method further comprising:
determining which of the code blocks can parse a sub-expression of the natural language expression; and
providing information about the code blocks determined to be able to parse the sub-expression in a second region of the user interface that is visually distinct from the first region.

12. The computer-implemented method of claim 11, further comprising:
responsive to receiving a selection of a code block of the output list, outputting additional information associated with the selected code block.

13. The computer-implemented method of claim 8, wherein attempting, for each code block of a plurality of the code blocks, to parse the natural language expression, comprises:
generating a new code block that refers to each of the plurality of the code blocks;
the new code block allowing the identification of each of the plurality of the code blocks that successfully parses the natural language expression;
executing the new code block that refers to each of the plurality of the code blocks; and
obtaining the list of the identified code blocks capable of parsing the natural language expression as a result of the executing of the new code block.

14. The method of claim 8, wherein each identified code block returns a match strength measure between the identified code block and the natural language expression.

15. The method of claim 14, wherein the list of identified code blocks is ordered according to the match strength measures associated with the identified code blocks.

16. The method of claim 8, wherein the code blocks that successfully parse the natural language expression are identified without receiving an expected return value.

17. The method of claim 8, wherein a grammar pattern specified by the code block comprises a choice of alternative expressions.

18. The method of claim 8, wherein a grammar pattern specified by the code block is one of: a context-free grammar rule, a regular expression, or a finite state automaton.

19. A computer system comprising:
a computer processor; and
a computer-readable storage medium storing a computer program having instructions executable by the computer processor, the instructions performing actions comprising:
storing a set of code blocks in a code repository, each code block comprising programming code configured to parse a corresponding set of natural language expressions, wherein at least some of the code blocks specify patterns that reference other code blocks;
receiving a first code block from a first developer;
storing the first code block in the code repository;
receiving a natural language expression from a second developer seeking code blocks capable of parsing the natural language expression, the second developer different from the first developer;
for each code block of a plurality of the code blocks, attempting to parse the natural language expression by executing the code block and determining whether the code block matches the natural language expression;
identifying a list of code blocks that successfully interpret the natural language expression, the list of identified code blocks comprising the first code block; and
outputting, to the second developer, metadata of blocks from the list of identified code blocks capable of interpreting the natural language expression.

* * * * *